US012758937B2

(12) United States Patent
Sandacz et al.

(10) Patent No.: US 12,758,937 B2
(45) Date of Patent: Oct. 13, 2026

(54) PROCESS AND APPARATUS FOR REDUCING PRESSURE IN A FLUE GAS STREAM

(71) Applicant: UOP LLC, Des Plaines, IL (US)

(72) Inventors: Michael S. Sandacz, Glen Ellyn, IL (US); Michael A. Stine, Lake Zurich, IL (US); Richard A. Johnson, II, Algonquin, IL (US)

(73) Assignee: UOP LLC, Rosemont, IL (US)

( * ) Notice: Subject to any disclaimer, the term of this patent is extended or adjusted under 35 U.S.C. 154(b) by 313 days.

(21) Appl. No.: 18/495,431

(22) Filed: Oct. 26, 2023

(65) Prior Publication Data

US 2025/0135428 A1 May 1, 2025

(51) Int. Cl.
*B01J 19/00* (2006.01)

(52) U.S. Cl.
CPC .. *B01J 19/0006* (2013.01); *B01J 2219/00162* (2013.01)

(58) Field of Classification Search
CPC ...... C10G 11/182; C10G 11/187; B01J 8/003; B01J 8/1863; B01J 19/0006; B01J 2219/00162
See application file for complete search history.

(56) References Cited

U.S. PATENT DOCUMENTS

| | | | | |
|---|---|---|---|---|
| 6,170,528 | B1 * | 1/2001 | Junier | F23J 13/00 181/251 |
| 6,680,030 | B2 * | 1/2004 | Koebel | B01J 38/04 95/122 |
| 7,022,221 | B1 * | 4/2006 | Hedrick | C10G 11/18 34/174 |
| 7,077,997 | B1 * | 7/2006 | Sandacz | C10G 11/182 422/140 |
| 2001/0027938 | A1 * | 10/2001 | Koebel | B01J 8/0055 422/139 |
| 2004/0004025 | A1 * | 1/2004 | Xu | B01J 8/002 208/113 |
| 2013/0336851 | A1 * | 12/2013 | Krishnamurthy | B01J 8/1827 422/232 |
| 2017/0165624 | A1 * | 6/2017 | Ravoin | C10G 11/18 |
| 2018/0178208 | A1 * | 6/2018 | Davydov | C10G 11/182 |
| 2018/0280917 | A1 * | 10/2018 | Victor | F28D 9/0006 |
| 2018/0318821 | A1 * | 11/2018 | Fei | B01J 8/0025 |
| 2019/0011126 | A1 * | 1/2019 | Gadari | F15D 1/025 |
| 2020/0033893 | A1 * | 1/2020 | Krishnamurthy | G05D 7/0676 |

* cited by examiner

*Primary Examiner* — Dominick L Plakkoottam
(74) *Attorney, Agent, or Firm* — Paschall & Associates, LLC; James C. Paschall

(57) ABSTRACT

A process for reducing pressure of a flue gas stream comprising passing a pressurized flue gas stream from a catalyst regenerator to an orifice chamber through an inlet. The pressurized flue gas stream is longitudinally passed through orifices in a plurality of plates in the chamber to reduce the pressure of the flue gas stream and passed from the chamber at a lower pressure than at the inlet. The plurality of orifice plates in the chamber may be spaced apart along a height of the chamber in an apparatus embodiment. Each one of the orifice plates may comprise an array of orifice strips. The strips may be sized to be inserted and removed from the chamber through a manway for installation and replacement. The process and apparatus may enable rapid replacement of eroded plates.

20 Claims, 4 Drawing Sheets

PROCESS AND APPARATUS FOR REDUCING PRESSURE IN A FLUE GAS STREAM

FIELD

The field is management of a flue gas stream from a catalyst regenerator and particularly from a catalytic regenerator such as in a fluid catalytic cracking (FCC) unit or a methanol to olefins (MTO) unit.

BACKGROUND

FCC technology has undergone continuous improvement and remains the predominant source of gasoline production in many refineries. This gasoline, as well as lighter products, is formed as the result of cracking heavier, higher molecular weight, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst. Coke must be burned off of the catalyst in a regenerator.

When a catalyst is exposed to oxygenates, such as methanol, to promote a reaction to olefins in a MTO process, carbonaceous material is generated and deposited on the catalyst. Accumulation of coke deposits interferes with the catalyst ability to promote the MTO reaction. As the amount of coke deposit increases, the catalyst loses activity and less of the feedstock is converted to the desired olefin product. The step of regeneration removes the coke from the catalyst by combustion with oxygen, restoring the catalytic activity of the catalyst. The regenerated catalyst may then be exposed again to oxygenates to promote the conversion to olefins.

Conventional catalyst regenerators typically include a vessel having a spent catalyst inlet, a regenerated catalyst outlet and a combustion gas distributor for supplying air or other oxygen containing gas to the bed of catalyst that resides in the vessel. Cyclone separators remove catalyst entrained in the flue gas before the flue gas exits the regenerator vessel. Downstream vessels such as a third stage separator may also be employed to remove catalyst fines from flue gas streams by cyclonic separation.

The heat of combustion in the regenerator typically produces flue gas at temperatures of 677° C. (1250° F.) to 788° C. (1450° F.) and at a pressure range of 138 kPa (20 psig) to 276 kPa (40 psig). A Flue gas stream which has a relatively low pressure must still be reduced in pressure before it is exhausted from a stack. Flue gas may be fed to a power recovery unit, which may include an expander turbine to recovery energy. The flue gas may also be run to a steam generator for further energy recovery. Even if the flue gas is passed through a third stage separator, a flue gas cooler and/or power recovery equipment it must still be reduced in pressure before it is exhausted from a stack.

Orifice chambers use plates with orifices to impose a pressure drop on the flue gas stream prior to venting through the stack. The high-pressure flue gas can erode through the orifices in the plates to an extent that requires replacement. Replacement requires the unit to be shut down or at least taking the orifice chamber off-line which can result in loss of profits. Putting the orifice chamber back on-line as soon as possible will minimize loss of profits.

The flue gas reduced in pressure in an orifice chamber may be fed to a CO boiler for further energy generation and recovery or to an electrostatic precipitator to further remove catalyst fines.

More improved pressure reduction vessels are needed to streamline catalyst regenerator flue gas processing and maintenance.

SUMMARY

A process for reducing pressure of a flue gas stream comprises passing a pressurized flue gas stream from a catalyst regenerator to an orifice chamber through an inlet. The pressurized flue gas stream is longitudinally passed through orifices in a plurality of plates in the chamber to reduce the pressure of the flue gas stream and passed from the chamber at a lower pressure than at the inlet. The plurality of orifice plates in the chamber may be spaced apart along a height of the chamber in an apparatus embodiment. Each one of the orifice plates may comprise an array of orifice strips. The strips may be sized to be inserted and removed from the chamber through a manway for installation and replacement. The process and apparatus may enable rapid replacement of eroded plates.

Additional features and advantages of the invention will be apparent from the description of the invention, figures and claims provided herein.

DEFINITIONS

The term “communication” means that material flow is operatively permitted between enumerated components.

The term “downstream communication” means that at least a portion of material flowing to the subject in downstream communication may operatively flow from the object with which it communicates.

The term “upstream communication” means that at least a portion of the material flowing from the subject in upstream communication may operatively flow to the object with which it communicates.

The term “direct communication” means that flow from the upstream component enters the downstream component without passing through any other intervening vessel.

The term “indirect communication” means that flow from the upstream component enters the downstream component after passing through an intervening vessel.

The term “bypass” means that the object is out of downstream communication with a bypassing subject at least to the extent of bypassing.

As used herein, the term "separator" means a vessel which has an inlet and at least two outlets.

As used herein, the term "predominant" or "predominate" means greater than 50 wt %, suitably greater than 75 wt % and preferably greater than 90 wt %.

As used herein, the term "a component-rich stream" means that the rich stream coming out of a vessel has a greater concentration of the component than the feed to the vessel.

DETAILED DESCRIPTION

We have found that orifices in plates of conventional orifice chambers may be prone to erosion due to the particulate content in the flue gas stream eroding the orifices and reducing the degree of pressure drop imposed on the flue gas stream over time. This pressure drop degradation forces the operator to move the upstream slide valve to a more closed position to shift the pressure drop to the upstream slide valve, which could potentially expose the flue gas line to high noise and vibration problems. Consequently, plates must be replaced periodically during a maintenance shut down. We have found that axial orifices result in less erosion. Moreover, plates that are assembled by an array of strips can be removed and installed quickly. For example, the strips can be sized with a width that fits through a manway, for ease of withdrawal and replacement to minimize turn-around time during a shut down.

Figure 1:
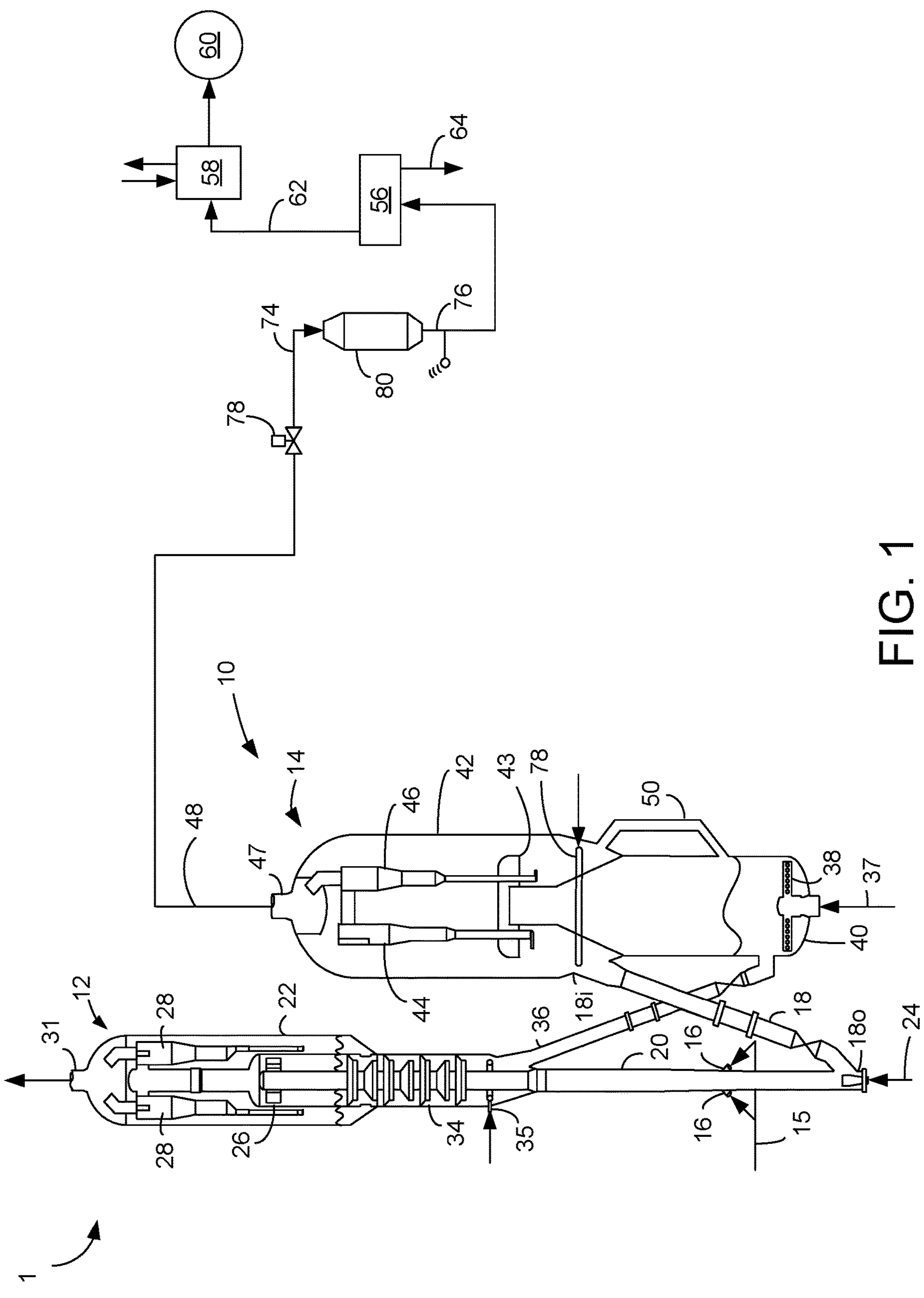
FIG. 1 is a schematic drawing of an FCC unit of the present disclosure.

Now turning to the FIG. 1, wherein like numerals designate like components, FIG. 1 illustrates a process and apparatus 1 for fluid catalytic cracking (FCC). An FCC unit 10 includes a reactor 12 and a regenerator 14. Process variables typically include a cracking reaction temperature of 400 to 600° C. and a catalyst regeneration temperature of 500 to 900° C. Both the cracking and regeneration occur at an absolute positive pressure between about 200 to about 400 kPa (g).

FIG. 1 shows a typical FCC reactor 12, in which a heavy hydrocarbon feed or raw oil stream in a line 15 is distributed by distributors 16 into a riser 20 to be contacted with a newly regenerated cracking catalyst entering from a regenerator conduit 18. This contacting may occur in the narrow riser 20, extending upwardly to the bottom of a reactor vessel 22. The contacting of feed and catalyst is fluidized by gas distributed from a fluidizing line 24. Heat from the catalyst vaporizes the hydrocarbon feed, and the hydrocarbon feed is thereafter cracked to lighter molecular weight hydrocarbons in the presence of the catalyst as both are transferred up the riser 20 into the reactor vessel 22. The cracked light hydrocarbon products are thereafter separated from the cracking catalyst using cyclonic separators which may include a rough-cut separator 26 and one or two stages of cyclones 28 in the reactor vessel 22. Product gases exit the reactor vessel 22 through a product outlet 31 for transport to a product recovery section which is not shown. Inevitable side reactions occur in the riser 20 leaving coke deposits on the catalyst that lower catalyst activity. The spent catalyst requires regeneration for further use. Coked catalyst, after separation from the gaseous product hydrocarbon, falls into a stripping section 34 where steam is injected through a nozzle 35 to a distributor to purge any residual hydrocarbon vapor. After the stripping operation, the coked catalyst is fed to the catalyst regenerator 14 through a spent catalyst conduit 36.

The FIG. 1 depicts a regenerator 14 known as a combustor. However, other types of regenerators are suitable. In the catalyst regenerator 14, a stream of oxygen-containing gas, such as air, is introduced from a line 37 through an air distributor 38 to contact the spent catalyst in a first, lower chamber 40, combust coke deposited on the spent catalyst, and provide regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 42 through a disengager 43. Finer separation of the regenerated catalyst and flue gas exiting the disengager 43 is achieved using first and second stage separator cyclones 44, 46, respectively within the upper chamber 42 of the catalyst regenerator 14. Catalyst separated from flue gas dispenses through dip legs from the cyclones 44, 46 while flue gas relatively lighter in catalyst sequentially exits cyclones 44, 46 and is discharged from the regenerator vessel 14 through a flue gas outlet 47 in a flue gas line 48.

Regenerated catalyst may be recycled back to the reactor 12 through the regenerator conduit 18. The riser 20 of the reactor 12 may be in downstream communication with the regenerator 14. The regenerator conduit has an inlet end **18*i* connecting to the regenerator 14, in an aspect the upper chamber 42 of the regenerator 14, for receiving regenerated catalyst therefrom and an outlet end 18*o* connecting to the riser 20 of the reactor 12 for transporting regenerated catalyst to the riser 20 of the reactor 12. As a result of the coke burning, the flue gas vapors exiting at the top of the catalyst regenerator 14 in the flue gas line 48 contain $SO_x$, $NO_x$, CO, $CO_2$, $N_2$, $O_2$ and $H_2O$, along with smaller amounts of other species. Additionally, some of these species may exit with regenerated catalyst exiting in a regenerator conduit 18 and enter the riser 20 of the reactor 12. In a combustor regenerator shown in the FIG. 1, regenerated catalyst may be transported from the upper chamber 42 into the lower chamber 40 of the regenerator 14 through a recycle conduit 50** to heat the lower chamber or after cooling by passing through a catalyst cooler that is not shown.

Hot flue gas is discharged from the regenerator 14 through the flue gas outlet 47 into a flue gas line 48 in downstream communication with the regenerator 14. Flue gas in the flue gas line 48 may enter an orifice chamber 80 to reduce the pressure of the flue gas and hence its kinetic energy. To control the flow of flue gas between the regenerator 14 and the orifice chamber 80, an inlet valve 78 may be provided upstream of the orifice chamber 80 to further control the gas flow entering the orifice chamber 80. The valve 78 may be a control valve and specifically a slide valve that is in communication with the flue gas line 48 for regulating the flow therethrough. The flue gas stream passes through the inlet valve 78 to enter the orifice chamber 80 through an inlet gas conduit 74. Other equipment may be provided between the regenerator and the orifice chamber 80 such as a third stage separator, a power recovery train including a turbine or other heat exchange equipment for recovering thermal energy.

The orifice chamber 80 is a vessel that reduces the pressure of the flue gas stream in the inlet gas conduit 74. The orifice chamber 80 can also be viewed as a wider length of inlet gas conduit 74. The flue gas stream reduced in pressure in an outlet gas conduit 76 may flow through a critical flow nozzle and flow to a steam generator 58 and to an outlet stack 60. The flue gas stream reduced in pressure in the outlet gas conduit 76 may be scrubbed in a scrubber and/or have catalyst particulates further removed in an electrostatic precipitator or be run through a CO boiler for further combustion of carbon monoxide and generation of steam before it is exhausted to the atmosphere in the outlet stack 60. As such, the flue gas stream reduced in pressure may be processed in a catalyst fines removal device 56 comprising an electrostatic precipitator or a wet gas scrubber before flowing to the steam generator 58 or the outlet stack 60 in low fines line 62. Fines can be removed from the catalyst fines removal device 56 in fines line 64. The steam generator 58 may also be known as a flue gas cooler which generates steam by cooling the flue gas in the gas outlet line 76. A pressure sensor on the outlet line 76 may transmit a pressure measurement to a receiver.

The orifice chamber 80 may be in downstream communication with the inlet gas conduit 74 which is in downstream communication with the catalyst regenerator 14. The pressurized flue gas may be passed from the catalyst regenerator 14 to the orifice chamber 80 via the inlet gas conduit 74.

Figures 2, 3:
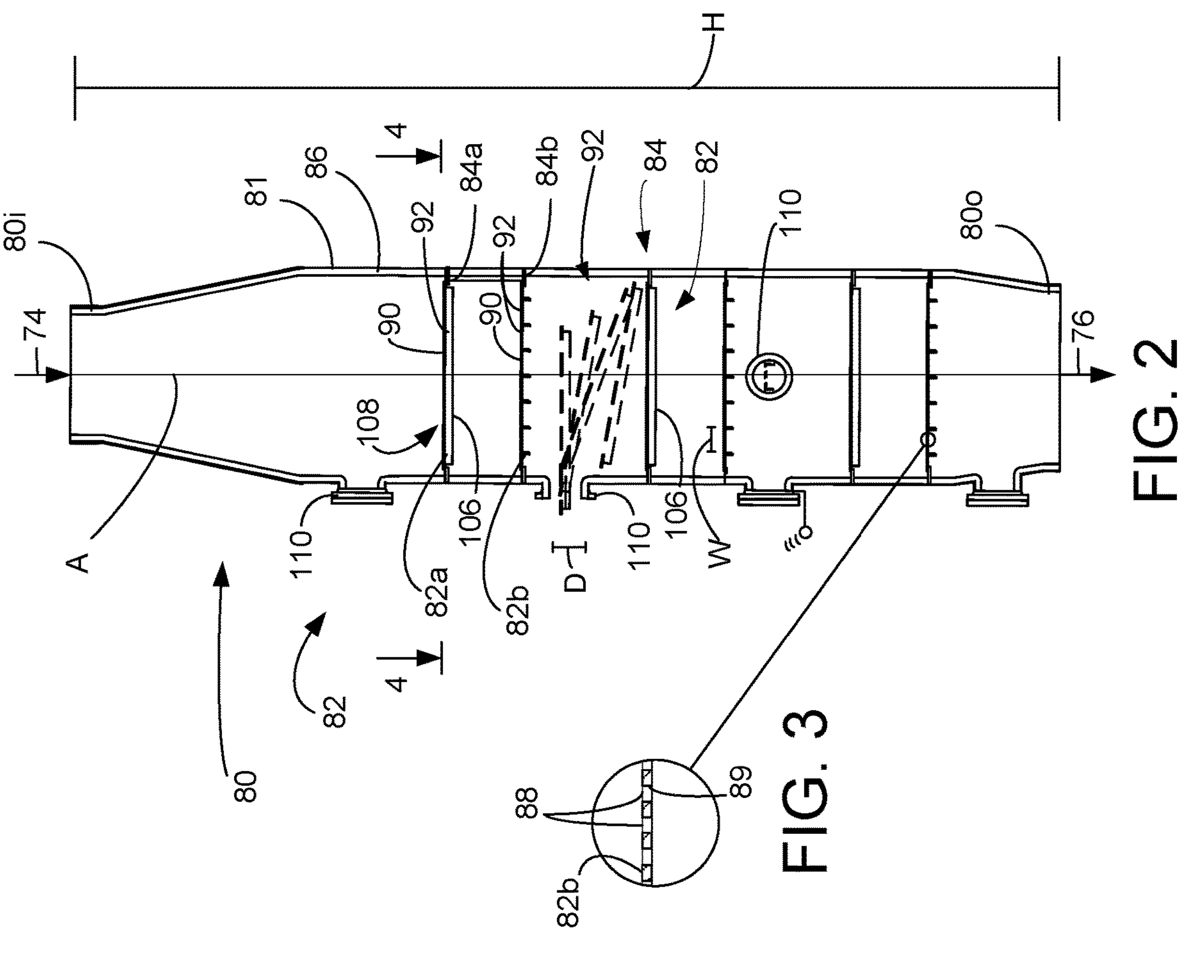
FIG. 2 is an elevational view of an orifice chamber.
FIG. 3 an enlarged partial view of a portion of FIG. 2.

More detail is illustrated in FIG. 2 for the orifice chamber 80. The orifice chamber 80 may comprise an inlet 80*i* in downstream communication with the catalyst regenerator 14 and an outlet 800 in downstream communication with the inlet 80*i*. The orifice chamber 80 comprises an outer wall 81 that may be cylindrical and tapered into frustums at the inlet 80*i* and the outlet 800. The inlet gas conduit 74 passes the pressurized flue gas stream to the inlet 80*i* of the orifice chamber 80.

A plurality of plates 82 are contained in the orifice chamber 80. Each of the plates 82*a*, 82*b* in the plurality are spaced along a height H of the chamber 80. The wall 81 is made of carbon steel or stainless steel and may have a refractory lining 86 on its inner surface. A plurality of annular shelves 84 may be secured to an intermediate annular wall (not shown) or directly to an inner surface of the wall 81. Each shelf 84 is for supporting a respective one of the plates 82. For example, shelf 84*a* supports plate 82*a*, and shelf 84*b* supports plate 84*b*. The shelves 84 may protrude through the lining 86.

FIG. 3 is a magnified view of a portion of FIG. 2 as indicated. Each plate 82, for instance plate 82*b*, includes a plurality of orifices 88. The orifices 88 may be longitudinal orifices meaning that orifices are oriented parallel to an axis A of the chamber. In other words, each orifice 88 may be a bore extending completely through the plate 82 and a cylindrical wall 89 defining the bore may be parallel to an axis A of the chamber. The orifices 88 may be drilled normal to an upper surface 108 of the plate 82. We have found that longitudinal orifices 88 are less prone to erosion by passing flue gas therethrough than orifices that are angled off of parallel to the axis A.

Each of the plates 82 may be flat or curved, so the plate provides a flat or domed upper surface 108. Each plate 82 also extends across the cross section of the chamber, so in conjunction with the shelf 84 pressurized gas must pass through the plate 82 to move through the orifice chamber 80. Consequently, when the pressurized flue gas stream passes through the inlet 80*i* to the chamber 80, the pressurized gas stream passes longitudinally through orifices 88 in each of the plurality of plates 82 in the chamber. Passing through orifices 88 in each of the plurality of plates 82 successively reduces the pressure of the flue gas stream. Consequently, when the flue gas stream exits the orifice chamber 80 through the outlet 800, it has a lower pressure than at the inlet 80*i*.

Figure 5:
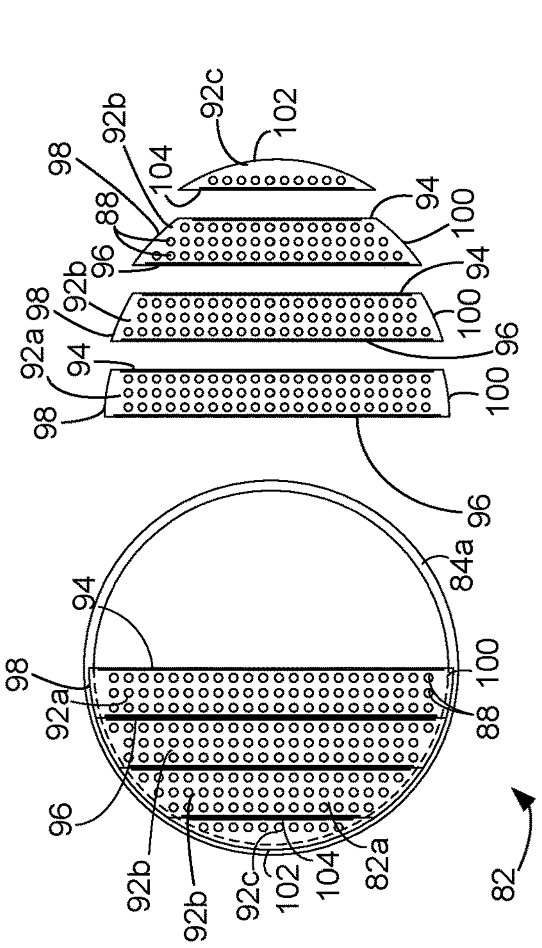
FIG. 5 is a partial exploded view of FIG. 4.
Figure 4:
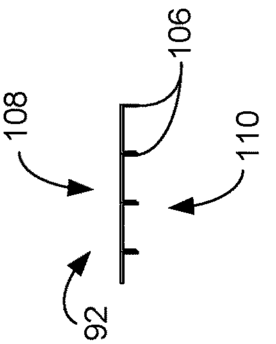
FIG. 4 is taken at segment 4-4 of FIG. 2 and shows an enlarged cross section of FIG. 2.
Figure 4:
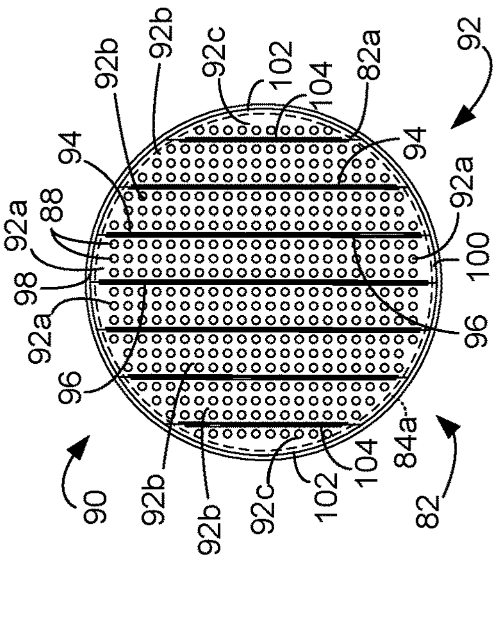

Each of the plurality of plates 82 may comprise an array 90 of orifice strips 92. FIG. 4 is taken at segment 4-4 of FIG. 2 and shows an enlarged cross section of FIG. 2 illustrating the orifice plate 82*a* comprising orifice strips 92. FIG. 4 shows an embodiment of eight orifice strips 92 per plate 82*a*, but other numbers of strips per plate 82 may be suitable. FIG. 5 replicates FIG. 4 but with four of the strips 92 of the plate 82*a* expanded and separated from the other four strips. Each plate 82 may have, for example, two diametrical strips 92*a*, zero to six chordal strips 92*b* and two end strips 92*c*. Each strip 92 in the array 90 has orifices 88 and suitably has a least one longitudinal straight edge 94. Diametrical strips 92*a* and chordal strips 92*b* may have two longitudinal straight edges 94 and 96 and two annular edges 98 and 100 which may be curved or diagonal. In an embodiment, end strips 92*c* have one longitudinal annular edge 102 and one longitudinal straight edge 104. The annular edges 98, 100 and 102 of strips 92 rest on the shelf 84*a* shown in FIG. 4 in a dashed line under the plate 82*a* but can be seen partially unhidden in FIG. 5. Each strip 92 in the array 90 of strips are laid, so the array in conjunction with the shelf 84 extends across an entire cross section of the orifice chamber 80 or which may be the cross section defined by an intermediate wall (not shown) if used.

Longitudinal straight edges 94, 96 104 of adjacent strips may be secured together such as by bolting or welding. The adjacent strips may be secured together by snaps or attachment clips. Snaps may comprise a post on one edge of a strip that is received with a groove on an edge of an adjacent strip. The snap may be secured by bolting or by a wedge pin. The longitudinal straight edge 94 of the diametrical strip 92*a* may be secured to the longitudinal straight edge 96 adjacent chordal strip 92*b*. The longitudinal straight edge 94 of diametrical strip 92*a* may be secured to the longitudinal straight edge 96 of the adjacent diametrical strip 92*a*. The longitudinal straight edge 94 of chordal strip 92*b* may be secured to the longitudinal straight edge 96 of the adjacent chordal strip 92*a*. Lastly, the longitudinal straight edge 94 of the chordal strip 92*b* may be secured to the longitudinal straight edge 104 of the adjacent end strip 92*c*.

Orifices 88 may be set up in a rectangular pitch at Cartesian coordinates or in a triangular pitch. For example, three columns of orifices 88 may be fashioned in the diametrical strips 92*a* and chordal strips 92*b*. Less columns of orifices 88 may be fashioned in the end strips 92*c*, such as one column of orifices.

Figure 7:
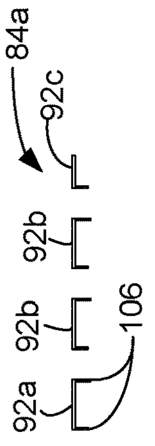
FIG. 7 is a partial elevational view of FIG. 5.
Figure 6:
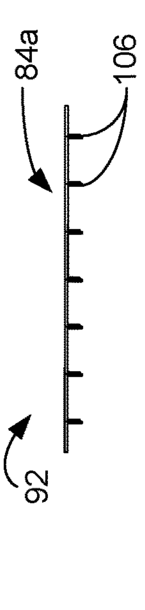
FIG. 6 is a partial elevational view of FIG. 4.

Each array 90 of strips 92 are laid across the orifice chamber 80, so gas must pass through an orifice 88 to pass through a plate 82. Each plate 82 may be designed to reduce pressure in the gas stream by 21 kPa (3 psi) to 105 kPa (15 psi). FIG. 6 shows an elevational view of the plate 82*a* of FIG. 4, and FIG. 7 shows an elevational view of the plate 82*a* partially expanded and broken away as in FIG. 5. The strips 92 are equipped with stiffener flanges 106 to maintain the rigidity of the strip 92 and plate 84*a* while having a reduced thickness relative to the flange. Attachment clips 118 may be fashioned to provide structural strength and stability to adjacent strips 92. The stiffener flange 106 may be oriented orthogonally to the top surface 108 or a bottom surface 110 of the strip 92*a*, 92*b* and 92*c*. Stiffener flanges 106 may be located along the longitudinal straight edges 94, 96 and 104 of each strip 92 which edges do not rest on the shelf 84*a* (FIG. 4). Adjacent strips 92 may be secured to each other by bolting, welding, snap fitting or clipping adjacent stiffener flanges 106 together. Stiffener flanges 106 may extend from a top surface 108, from a bottom surface or from both. In FIG. 5, stiffener flanges 106 extend from a bottom surface of the strips 92. Stiffener flanges 106 may extend to short of the annular edges, 98, 100 or 102 to accommodate the strip 92 being nested on the shelf 84.

Turning back to FIG. 2, the stiffener flange 106 extending to short of the shelf 84 can be seen. The orifice chamber 80 includes at least one manway 110 and preferably a plurality of manways. Each of the strips 92 has a width W that is less than a diameter D of the manway 110. Consequently, each strip 92 can be inserted into the orifice chamber 80 through a manway 110 by inserting the narrow strip widthwise through the manway into the orifice chamber and supporting the strip on the shelf 84 for the particular plate 82. FIG. 2 exhibits the motions of a strip 92 in phantom being inserted through the manway 110 into the orifice chamber 80 and being laid onto the shelf 84. Another manway 110 parallel with the page shows a strip 92 in phantom fitting therethrough widthwise. Each of the strips 92 can be inserted through the manway before the strip is laid in the array 90 across the orifice chamber 80.

Referring to FIGS. 4 and 5, after insertion of the end strip **92*c* into the orifice chamber 80 through the manway 110, the annular edge 102 of the strip will rest on the shelf 84. After insertion of the diametrical strip 92*a* and the chordal strip 92*b* into the orifice chamber 80 through the manway 110, an annular edge 98, 100 of the strip will rest on the shelf 84 before the other opposite edge 100, 98 of the strip is rested on the shelf. Adjacent strips 92 in the array 90 should then be secured together. The strips 92 in the array 90 may be secured to the shelf 84 perhaps by welding or by connection clips to prepare a plate 82** for operation.

Manways 110 may be located at locations horizontally rotated from each other along the circumference of the orifice chamber 80 for additional access at 45 to 135 degrees such as at 90 degrees. Strips 92 of arrays 90 in adjacent plates **82*a*, 82*b*, respectively, may be oriented angularly, such as perpendicularly, to each other. Straight edges of strips 92 of adjacent plates 82*a*, 82*b* will be angular, such as perpendicular, to each other. Strips in the array 90 are laid to extend across a cross section of the orifice chamber 80 of the first plate 82*a* in a first orientation. Strips in an adjacent array 90 are laid to extend across the cross section of the orifice chamber 80 of the second plate 82*b* in a second orientation that may or may not be aligned with the first orientation. For example, the second orientation may be angled such as perpendicular to the first orientation. Orifices 88 in adjacent plates 82*a*, 82*b*** may be horizontally aligned with each other.

During a shutdown, damaged strips 92 can be unsecured from adjacent strips and removed from the orifice chamber 80 through the manway 110 and repaired and/or replaced and inserted back into the orifice chamber 80 through the manway back into place. The ease of removal of strips 92 of plates 82 greatly reduce the time necessary to repair or replace strips. Spares of strips can even be had on hand to further reduce turn-around time.

Figure 8:
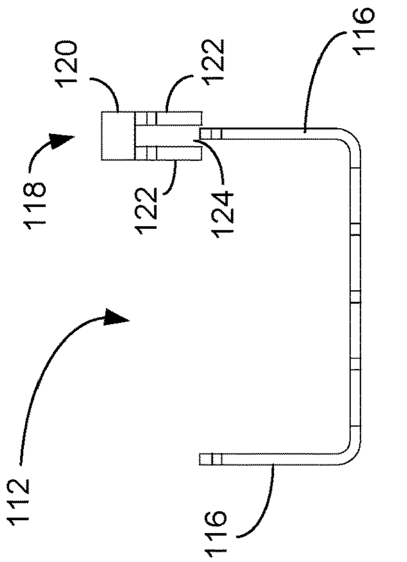
FIG. 8 is an enlarged sectional view of an alternative strip of the disclosure.

FIG. 8 shows a strip 112 with stiffener flanges 116 turned upwardly which make assembly more facile from the top side. Bolt holes are arranged in the top of each stiffener flange 116 at regular intervals along their length. Clips 118 comprising a top 120 and two spaced legs 122 depending from the top can be employed to secure adjacent strips 112 together. The spaced legs 122 define a recess 124 therebetween under the top 120. Bolt holes in a top end of the legs 122 may be spaced at regular intervals along the length of the clips 112 in correspondence to the spacing of the bolt holes in the stiffener flanges 116.

Figure 9:
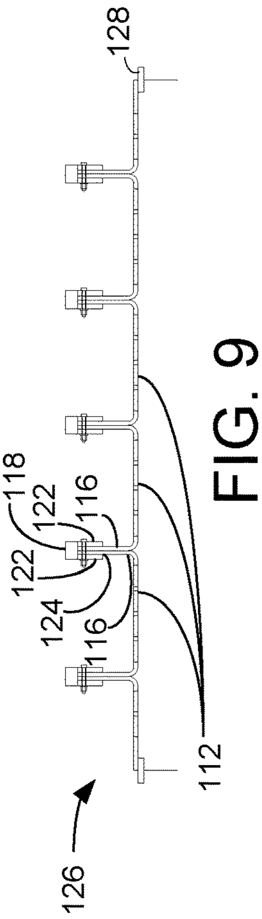
FIG. 9 is an alternative partial elevational view of FIG. 6 with the strip of FIG. 8.

FIG. 9 shows six strips 112 arranged together to provide a plate 126. Top ends of legs 116 of adjacent strips 112 are received in the recess 124 and sandwiched together. A bolt may be inserted through the hole in the leg 122 of a clip 118, through holes in flanges 116 of adjacent strips 112 and through the hole of the other leg 122 of the clip to secure adjacent strips 112 together. In FIG. 9, six strips 112 are secured together in this way to provide a plate 126 resting on a shelf 128.

Figure 10:
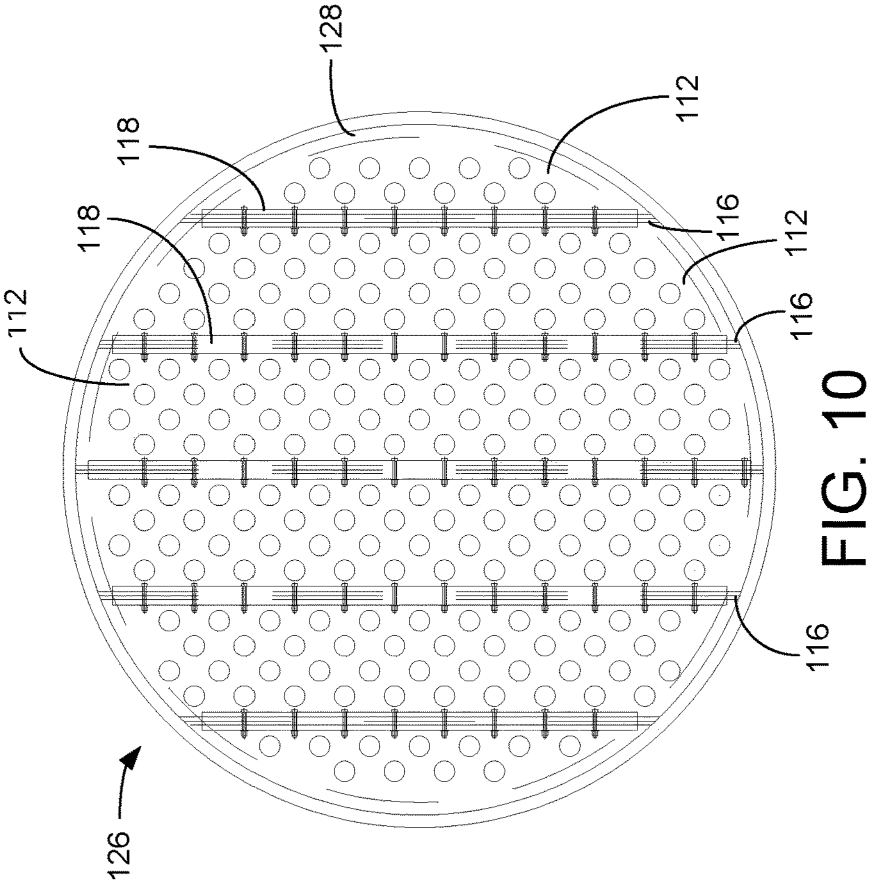
FIG. 10 is an alternative sectional view of FIG. 4 with the strip of FIG. 8.

The plate 126 is shown in plan view in FIG. 10. In FIG. 10, it can be seen that the clips 118 may extend the entire length of the strip 112 to an intersection with the shelf 128 at both ends of the strip. The shelf 128 supports the strips 112. The clips 118 of extended length block gas or catalyst fines from entering any gap between stiffener flanges 116 of adjacent strips 112.

Any of the above lines, units, separators, columns, surrounding environments, zones or similar may be equipped with one or more monitoring components including sensors, measurement devices, data capture devices or data transmission devices. Pressure sensors can be located in the orifice chamber 80 such as with access through or around a manway 110. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring components, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the disclosure is a process for reducing pressure of a flue gas stream comprising passing a pressurized flue gas stream to a chamber through an inlet; passing the pressurized flue gas stream longitudinally through orifices in a plurality of plates in the chamber to reduce the pressure of the flue gas stream; and passing the flue gas stream from the chamber at a lower pressure than at the inlet. An embodiment of the disclosure is one, any or all of prior embodiments in this paragraph up through the first embodiment in this paragraph wherein one of the plurality of orifice plates is flat or domed. An embodiment of the disclosure is one, any or all of prior embodiments in this paragraph up through the first embodiment in this paragraph wherein one of the plurality of orifice plates comprises an array of strips. An embodiment of the disclosure is one, any or all of prior embodiments in this paragraph up through the first embodiment in this paragraph further comprising laying each strip in the array of strips so the array extends across a cross section of the chamber. An embodiment of the disclosure is one, any or all of prior embodiments in this paragraph up through the first embodiment in this paragraph further comprising securing a side of one of the several strips to a side of an adjacent one the several strips. An embodiment of the disclosure is one, any or all of prior embodiments in this paragraph up through the first embodiment in this paragraph wherein flanges of adjacent strips are secured to each other with a clip. An embodiment of the disclosure is one, any or all of prior embodiments in this paragraph up through the first embodiment in this paragraph further comprising inserting each of the several strips through a manway in the chamber before laying each of the several strips in the array. An embodiment of the disclosure is one, any or all of prior embodiments in this paragraph up through the first embodiment in this paragraph wherein a second one of the plurality of orifice plates comprises a second array of strips and further comprising laying each of the strips in the second array that extends across a cross section of the chamber in an orientation that is not aligned with an orientation of the first one of the plurality of orifice plates. An embodiment of the disclosure is one, any or all of prior embodiments in this paragraph up through the first embodiment in this paragraph further comprising removing one of the several strips through the manway in the chamber after laying each of the several strips in an array that extends across a cross section of the chamber. An embodiment of the disclosure is one, any or all of prior embodiments in this paragraph up through the first embodiment in this paragraph further comprising passing the flue gas from a catalyst regenerator to the chamber. An embodiment of the disclosure is one, any or all of prior embodiments in this paragraph up through the first embodiment in this paragraph further comprising taking a pressure measurement of the flue gas stream and transmitting the measurement.

A second embodiment of the disclosure is a chamber for reducing pressure of a flue gas stream comprising an inlet to the chamber; a plurality of orifice plates in the chamber spaced apart along a height of the chamber, each one of the orifice plates comprising an array of orifice strips; and an outlet from the chamber. An embodiment of the disclosure is one, any or all of prior embodiments in this paragraph up through the second embodiment in this paragraph wherein the inlet is in downstream communication with a catalyst regenerator. An embodiment of the disclosure is one, any or all of prior embodiments in this paragraph up through the second embodiment in this paragraph wherein the orifice plates having orifices oriented parallel to the longitudinal axis of the chamber. An embodiment of the disclosure is one, any or all of prior embodiments in this paragraph up through the second embodiment in this paragraph one of the plurality of orifice plates is flat. An embodiment of the disclosure is one, any or all of prior embodiments in this paragraph up through the second embodiment in this paragraph wherein one of the orifice plates extends across a cross section of the chamber. An embodiment of the disclosure is one, any or all of prior embodiments in this paragraph up through the second embodiment in this paragraph wherein a side of one of the several strips is secured to a side of an adjacent one the several strips. An embodiment of the disclosure is one, any or all of prior embodiments in this paragraph up through the second embodiment in this paragraph further comprising a manway in the chamber and each of the strips has a width that is less than a diameter of the manway. An embodiment of the disclosure is one, any or all of prior embodiments in this paragraph up through the second embodiment in this paragraph wherein the strips include a stiffener flange oriented orthogonal to the surface of the strip. An embodiment of the disclosure is one, any or all of prior embodiments in this paragraph up through the second embodiment in this paragraph wherein the array of strips in one of the plurality of plates is oriented at an angle to strips in an adjacent one of the plurality of plates.

A third embodiment of the disclosure is a chamber for reducing pressure of a flue gas stream comprising an inlet to the chamber in downstream communication with a catalyst regenerator; a plurality of orifice flat plates in the chamber spaced apart along a height of the chamber, each one of the orifice plates comprising an array of orifice strips; and an outlet from the chamber.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for reducing pressure of a flue gas stream comprising: passing a pressurized flue gas stream to a chamber through an inlet; passing the pressurized flue gas stream longitudinally through orifices in a plurality of plates in the chamber to reduce the pressure of the flue gas stream; and passing the flue gas stream from the chamber at a lower pressure than at the inlets wherein one of said plurality of orifice plates comprises an array of strips with adjacent ones of said strips secured to each other, wherein each strip of said array of strips has orifices.

2. The process of claim 1 wherein one of said plurality of orifice plates is flat or domed.

3. The process of claim 1 further comprising laying each strip in said array of strips so the array extends across a cross section of the chamber.

4. The process of claim 3 further comprising securing a side of one of said several strips to a side of an adjacent one said several strips.

5. The process of claim 4 wherein flanges of adjacent strips are secured to each other with a clip.

6. The process of claim 3 further comprising inserting each of said several strips through a manway in said chamber before laying each of said several strips in the array.

7. The process of claim 3 wherein a second one of said plurality of orifice plates comprises a second array of strips and further comprising laying each of said strips in said second array that extends across a cross section of the chamber in an orientation that is not aligned with an orientation of said first one of said plurality of orifice plates.

8. The process of claim 3 further comprising removing one of said several strips through said manway in said chamber after laying each of said several strips in an array that extends across a cross section of the chamber.

9. The process of claim 1 further comprising passing the flue gas from a catalyst regenerator to said chamber.

10. The process of claim 1 further comprising taking a pressure measurement of said flue gas stream and transmitting said measurement.

11. A chamber for reducing pressure of a flue gas stream comprising: an inlet to the chamber; a plurality of orifice plates in the chamber spaced apart along a height of the chamber, each one of said orifice plates comprising an array of orifice strips; and an outlet from the chamber, wherein one of said plurality of orifice plates comprises said array of orifice strips with adjacent ones of said orifice strips secured to each other.

12. The process of claim 11 wherein said orifice plates have orifices oriented parallel to the longitudinal axis of the chamber.

13. The process of claim 11 wherein one of said plurality of orifice plates is flat.

14. The process of claim 11 wherein one of said orifice plates extends across a cross section of the chamber.

15. The process of claim 11 wherein a side of one of said several strips is secured to a side of an adjacent one said several strips.

16. The process of claim 11 further comprising a manway in said chamber and each of said orifice strips has a width that is less than a diameter of the manway.

17. The process of claim 11 wherein said orifice strips include a stiffener oriented orthogonal to the surface of the strip.

18. The process of claim 11 wherein said array of orifice strips in one of said plurality of plates is oriented at an angle to orifice strips in an adjacent one of said plurality of plates.

19. The process of claim 11 wherein said inlet is in downstream communication with a catalyst regenerator.

20. A chamber for reducing pressure of a flue gas stream comprising: an inlet to the chamber in downstream communication with a catalyst regenerator; a plurality of orifice flat plates in the chamber spaced apart along a height of the chamber, each one of said orifice plates comprising an array of orifice strips; and an outlet from the chamber, wherein flanges of adjacent orifice strips are secured to each other.

* * * * *